Sept. 22, 1953 C. E. INGALLS ET AL 2,653,229
AUTOMATIC GAIN CONTROL CIRCUIT
Filed Feb. 19, 1945
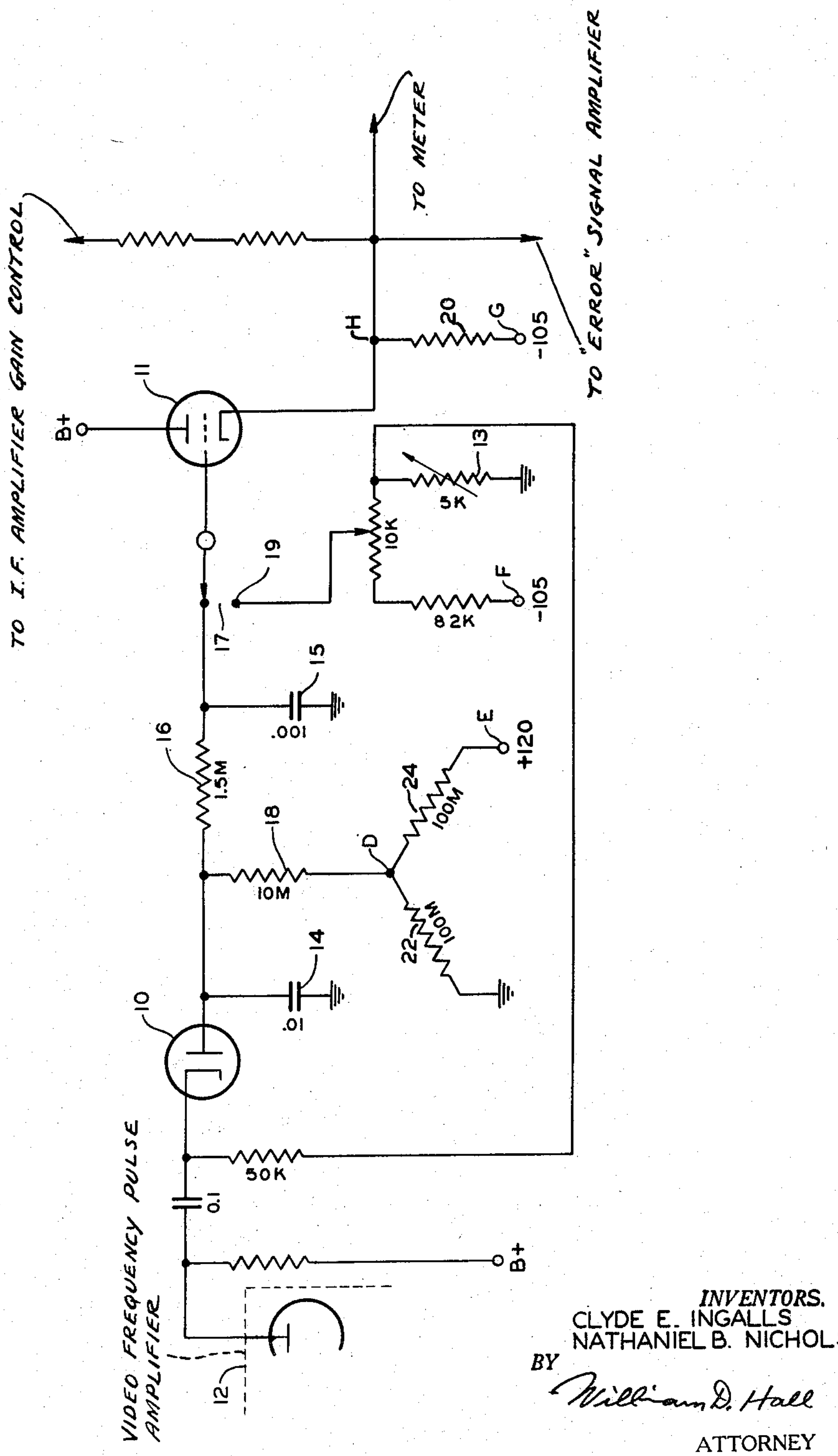
INVENTORS.
CLYDE E. INGALLS
NATHANIEL B. NICHOLS
BY William D. Hall
ATTORNEY Patented Sept. 22, 1953 2,653,229

UNITED STATES PATENT OFFICE 2,653,229

AUTOMATIC GAIN CONTROL CIRCUIT

Clyde E. Ingalls, Lexington, and Nathaniel B. Nichols, Cambridge, Mass., assignors, by mesne assignments, to the United States of America as represented by the Secretary of War Application February 19, 1945, Serial No. 578,769

5 Claims. (Cl. 250—20)

The present invention pertains generally to electrical apparatus and more particularly to automatic gain control circuits employed in radio receivers.

In any radio receiver one problem which must be considered is that of controlling the gain of the intermediate frequency stages in a manner whereby the receiver gain may be elevated during the reception of weak signals and maintained below the blocking level during the reception of very strong signals. Particularly in some electronic systems employing radio receivers, the amplitude of the signal in the intermediate frequency stages will vary because of fading and because of overloading of the tubes therein.

An added problem of special importance exists in electronic systems used for the tracking of targets wherein an "error" signal is developed whose phase and magnitude are functions of the orientation of the target being tracked with respect to the antenna, and this "error" signal is then used as a means of positioning the antenna. In one of such systems wherein an exploratory beam of radiated electromagnetic pulses is made to scan a conical area in space, the magnitude of the "error" signal depends upon the relative strengths of the echo pulses received from a specified target during conical scanning. The pulse repetition frequency may be fixed or may vary in a predetermined manner. Since scanning is continuous, the "error" signal is developed continuously. For the proper operation of this system, it is essential to maintain the phase of the "error" voltage constant for all values of input signals. Accordingly it is the principal object of the present invention to provide a method of automatic gain control which satisfies the foregoing requirement.

The conventional automatic gain control method utilizes the principle of detecting the output of the intermediate frequency amplifier stages and of deriving therefrom a direct voltage which is proportional to the output yielded by the detector. This voltage is fed back to one or more prior intermediate frequency amplifiers in the form of a variable bias such that when the incoming signal is strong, the bias is fairly large, whereas, when the incoming signal is weak, the bias is very small. This causes the amplification of the intermediate frequency amplifiers to be greater for weak signals than for those of large magnitude. This conventional method when employed in a system using conical scanning serves to average the amplitude of the incoming video pulses over a period of approximately one scan cycle. The automatic gain control response to the scanning frequency is, therefore, of small magnitude. A difficulty of this system, however, is that a sudden strong signal produced by any means will render the receiver insensitive for a short period thereafter. Another object of the present invention, therefore, is to eliminate this difficulty by causing the averaging effect to take place over only a few pulses so as to shorten the recovery time of the receiver.

Another object of this invention is to reduce fading which is more rapid than that eliminated by previous A. G. C. circuits. This has the particular advantage of maintaining the echo video pulse uniform with respect to amplitude and shape, thus increasing the accuracy of the determination of target range which is made by measuring visually or electrically the elapsed time between the transmitted and received pulses.

For further understanding of this invention, together with other objects and features thereof, reference is had to the following detailed description to be read in connection with the accompanying drawing which shows a schematic diagram of a radio receiver using the principles of this invention. The scope of the invention will be pointed out in the annexed claims.

Referring now to the drawing, there is shown a circuit diagram of an automatic gain control system for a pulse receiver including a diode 10, which is a rectifier serving to produce automatic gain control voltage and also serving as an "error" signal demodulator, and a triode 11, connected as a cathode follower amplifier and functioning as the gain control tube. The cathode of diode 10 is coupled to the output circuit of the receiver video frequency amplifier 12. The potential on the cathode of diode 10 may be varied by the manual adjustment of variable resistor 13, and is adjusted to a value such that in the absence of any signal applied to the cathode from the video amplifier 12, the grid of triode 11 is at such a potential that the I. F. amplifier is at maximum gain. A filter network including capacitors 14 and 15 and resistor 16 is connected between the anode of diode 10 and a single-pole, double-throw switch 17, which in turn is connected to the grid of triode 11. The output of triode 11 is taken across its cathode resistor 20.

Arrow A represents an output terminal of the circuit which is connected to the grid bias circuit of a prior I. F. amplifier stage or stages, arrow B represents an output terminal which may be utilized as a meter connection to indicate signal amplitude, and arrow C represents an output terminal by which the "error" signal can be injected into an "error" signal amplifier for automatic tracking purposes.

The time constants of the R.-C. combinations formed by condenser 14 and condenser 15 with resistor 16 are made large enough so that the repetition rate of the pulse will be filtered from the detector voltage. These time constants are small enough, however, so that the desired "error" frequencies will pass through without prohibitive phase shift. Since in a conventional system the pulse repetition rate of the signal will be of the order of 400 cycles per second, and the "error" signal frequency will be of the order of 30 cycles per second, the design of R.-C. combinations having suitable time constants is readily accomplished.

Resistors 18, 22, and 24 form a voltage divider biasing circuit by means of which in an actual embodiment point D is set to about plus 60 volts. In the absence of any signal, diode 10 is conducting and condensers 14 and 15 will be charged to a small negative voltage and the grid of triode 11 will be at this voltage with respect to ground. In effect this biasing circuit adjusts the operating level of triode 11.

In operation, a series of negative pulse signals are applied to the cathode of diode 10 from the output circuit of video amplifier 12, causing diode 10 to conduct more heavily. Whenever a signal is conducted by diode 10, a more negative charge is put on condensers 14 and 15. This negative charge is sufficient to prevent diode 10 from conducting after the termination of a pulse, which effectively disconnects the source of negative voltage at resistor 13. Therefore, condensers 14 and 15 discharge toward the plus 60 volt potential at point D. It can be seen that placing point D at a relatively high potential hastens the discharge of these condensers and has the effect of reducing the time constants of the R.-C. filter circuit. However, the time constants of the R.-C. filter circuit are sufficiently long relative to the period between pulses so that for applied negative pulses having greater than a given minimum amplitude, the next pulse in the series occurs before condensers 14 and 15 have discharged to the point where diode 10 becomes conducting. Therefore, so long as the applied pulses have greater than this given amplitude, diode 10 will conduct only during the application of a pulse and will be non-conducting during the entire period between pulses. This action causes the grid of triode 11 to have a more negative average voltage during the time when a series of pulses are passing through the detector, and the greater the pulse amplitude the more negative the average voltage.

If the pulse amplitude tends to increase, the resulting change in average grid voltage causes triode 11 to conduct less heavily, which in turn causes its cathode to become more negative due to a decrease of voltage drop in the cathode resistor 20. This change of voltage at point H is transmitted to the grids of one or more I. F. stages in the form of a more negative bias which causes these stages to have a reduced amplification, hence tending to reduce the amplitude of the output from the I. F. stages.

If the pulse amplitude suddenly decreases, condensers 14 and 15 must discharge rapidly in order to restore the receiver to greater sensitivity. This is because the rate of discharge is accelerated, as has been stated above, by making the voltage toward which condensers 14 and 15 tend to discharge, point D, much more positive than that necessary for full sensitivity of the receiver.

For signals coming through the video amplifier regularly and having greater than the given minimum amplitude, mentioned above, the speed at which the A. G. C. acts is faster than the time constants of the A. G. C. circuit due to the high positive voltage at point D. However, if the signals come through the video amplifier sporadically or have less than this given amplitude, condensers 14 and 15 will discharge to the point where diode 10 becomes conducting before the next pulse from video amplifier 12 arrives; thereby connecting the source of negative voltage at resistor 13 across the R.-C. filter circuit and in series with the positive voltage at point D. This entirely changes the effective time constants of the A. G. C. circuit. The A. G. C. circuit then recovers at the rate determined by its new time constants and the voltages involved.

Since the effective time constants of the R.-C. filter circuit are small enough to allow "error" voltages of the scan frequency to pass, the voltage reaching the grid of triode 11 is a direct current voltage with an "error" frequency voltage imposed thereon. The presence of this "error" frequency which is transmitted to the grid circuits of the I. F. stages along with the gain control bias, causes the "error" frequency variation of pulse amplitude to be decreased and hence causes the resultant "error" frequency voltage present at point H to be decreased. Since the automatic gain control action does not compensate entirely for change in signal amplitude, the amount of "error" frequency voltage present at point H is still sufficient to drive an "error" signal amplifier whose output may then be used as a means for the required positioning of the antenna.

By shifting switch 17 to contact 19, the gain control may be manually adjusted by resistor 13. This varies the voltage on the grid of triode 11, and as before, the resulting change of current through triode 11 causes a change in voltage at point H which is transmitted as a change in bias to the I. F. stages and changes their gain.

While there has been described what is at present considered a preferred embodiment of the invention, it will be obvious to those skilled in the art that various changes and modifications may be made therein without departing from the invention, and it is aimed in the appended claims to cover all such changes as fall within the true scope of the invention.

What we claim to have invented is:

1. In a radio pulse receiver which includes means for demodulating pulses and means for amplifying received pulses prior to demodulation, said amplifying means having a gain in accordance with a gain control potential applied thereto; an automatic gain control circuit comprising a capacitor, a first resistor serially connected to said capacitor, a first source of direct current voltage providing a potential of a given polarity relative to a point of reference potential, means applying said potential of a given polarity to one terminal of said capacitor through said first resistor, the other terminal of said capacitor being connected to said point of reference potential, thereby tending to charge said capacitor toward said potential of a given polarity, a second source of direct current voltage providing a potential of an opposite polarity to said given polarity relative to said point of reference potential, a unidirectional conducting device having two terminals, one terminal of said unidirectional conducting device being connected directly to the junction of said first resistor and capacitor, a second resistor, means applying said potential of opposite polarity to the other terminal of said unidirectional conducting device through said second resistor, said unidirectional conducting device being connected to render it normally conducting, means for applying demodulated pulses having said opposite polarity across said second resistor, said second resistor being small compared to said first resistor, and translating means coupled to the junction of said first resistor and capacitance and responsive to the potential thereat for applying a gain control potential to said amplifying means.

2. An automatic gain control circuit according to claim 1, wherein said demodulated pulses have a predetermined repetition rate and an amplitude which varies at a substantially fixed and relatively low error frequency and wherein said first resistor and said capacitor form a network having a time constant which is long relative to said repetition rate and short relative to said error frequency.

3. An automatic gain control circuit according to claim 1, wherein said translating means includes a cathode follower, means for applying the potential at the junction of said first resistor and capacitor to the input of said cathode follower, and means for applying the output of said cathode follower to said amplifying means as said gain control potential.

4. An automatic gain control circuit according to claim 3, wherein said demodulated pulses have a predetermined repetition rate and an amplitude which varies at a substantially fixed and relatively low error frequency; and wherein said means for applying the output of said cathode follower includes a resistance-capacitance filter; and wherein said first resistor, said capacitor and said resistance-capacitance filter form a network having a time constant which is long relative to said repetition rate and short relative to said error frequency.

5. An automatic gain control circuit according to claim 1, wherein said first source of voltage is positive relative to said reference potential and includes a first voltage divider connected thereacross, and wherein said second source of voltage is negative relative to said reference potential and includes a second voltage divider connected thereacross, said first resistor being connected to a point on said first voltage divider and said second resistor being connected to a point on said second voltage divider, and said applied demodulated pulses having a negative polarity.

CLYDE E. INGALLS.
NATHANIEL B. NICHOLS.

References Cited in the file of this patent

UNITED STATES PATENTS

| Number | Name | Date |
|---|---|---|
| 1,772,517 | Ohl | Aug. 12, 1930 |
| 1,950,145 | Hentschel | Mar. 6, 1934 |
| 2,018,982 | Travis | Oct. 29, 1935 |
| 2,083,501 | Lane, Jr. | June 8, 1937 |
| 2,108,899 | Peterson | Feb. 22, 1938 |
| 2,144,304 | Braden | Jan. 17, 1939 |
| 2,157,677 | Runge | May 9, 1939 |
| 2,224,134 | Blumlein | Dec. 10, 1940 |
| 2,240,593 | Wilson | May 6, 1941 |
| 2,314,707 | Katzin | Mar. 23, 1943 |
| 2,385,212 | Konrad | Sept. 18, 1945 |